United States Patent [19]

Shi et al.

[11] Patent Number: 5,700,298
[45] Date of Patent: Dec. 23, 1997

[54] CARBON ANODE FOR LITHIUM ION ELECTROCHEMICAL CELL

[75] Inventors: Hang Shi; Jeremy Barker; Rene Koksbang, all of Henderson, Nev.

[73] Assignee: Valence Technology, Inc., Henderson, Nev.

[21] Appl. No.: 616,826

[22] Filed: Mar. 15, 1996

[51] Int. Cl.$^6$ .............................. H01M 6/00; H01M 4/62; C01B 31/04; C25B 11/12
[52] U.S. Cl. .................. 29/623.1; 429/232; 423/448; 204/294
[58] Field of Search ................ 429/232; 423/448; 29/623.1; 204/294

[56] References Cited

U.S. PATENT DOCUMENTS

| 4,089,934 | 5/1978 | Akiyoshi et al. | 423/448 |
| 5,522,127 | 6/1996 | Ozaki et al. | 29/623.5 |
| 5,527,643 | 6/1996 | Sonobe et al. | 423/448 |

FOREIGN PATENT DOCUMENTS

| 0 660 432 A | 6/1995 | European Pat. Off. |
| 0 738 018 A | 10/1996 | European Pat. Off. |
| 3-50110 | 3/1991 | Japan |

OTHER PUBLICATIONS

N. N. Greenwood and A. Earnshaw, "Chemistry of the Elements", Pergamon Press, pp. 303 and 304 month unavailable.

Shi et al., "Structure–Refinement Program for Disordered Carbons", J. Appl. Cryst., 26 (1993), pp. 827–836 month unavailable.

Hang Shi, Ph.D., Thesis entitled: Disordered Carbons and Battery Applications, Simon Fraser University, (1993) Sep.

Kirda et al., "Change in Properties of Graphite After Mechanical Treatment in Various Media", Khim. Tverd. Topl., 6, pp. 77–81, 1992.

Primary Examiner—Kathryn L. Gorgos
Assistant Examiner—Edna Wong
Attorney, Agent, or Firm—Charles Jew

[57] ABSTRACT

Increasing the percentage of the 3R phase present in graphite reduces the first capacity loss of anodes employing the so modified graphite. Conversion of 2H phase graphite to 3R phase graphite can be achieved by grinding graphite. Non-aqueous solid electrochemical cells with improved performance can be fabricated by employing intercalation based carbon anodes comprising graphite with high percentage of 3R. When employed in an electrochemical cell, the first cycle capacity loss of only about 10%.

20 Claims, 5 Drawing Sheets

Microfiche Appendix Included
(1 Microfiche, 27 Pages)

CARBON ANODE FOR LITHIUM ION ELECTROCHEMICAL CELL

MICROFICHE APPENDIX

This document includes a microfiche appendix which contains 1 microfiche having a total of 27 frames.

FIELD OF INVENTION

The present invention relates to electrochemical devices and, more particularly, to non-aqueous electrochemical cells demonstrating improved performance.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

The use of carbon anodes however is not without problems. As $Li_xC$ is a reactive material which is difficult to handle in air, it is preferably produced in-situ in a cell. In doing so, some of the lithium is electrochemically inactivated via an irreversible process. This irreversible process results in an initial capacity loss for the cell which reduces the cell's overall performance. Furthermore, the cell often exhibits a progressive loss of capacity over numerous charge/discharge cycles. This progressive loss is commonly referred to as "capacity fade."

In view of the above shortcomings associated with the prior art, there is a need for non-aqueous electrochemical devices that are capable of providing improved performance, including better cycle life, specific electrode capacities, and energy density.

SUMMARY OF THE INVENTION

The invention is based in part on the discovery that the phases of graphite affect the first capacity loss associated with anodes that employ graphite in lithium ion electrochemical cells and batteries. In particular it has been discovered that increasing the level of the 3R phase (rhombohedral) (as opposed to the 2H (hexagonal) phase) in graphite tends to reduce the first capacity loss percentage.

In one aspect, the invention is directed to a method of preparing an electrochemical cell and controlling the first cycle capacity loss of said electrochemical cell, which method comprises the steps of:

providing an anode comprising graphite particles;

measuring the percentage of 3R phase graphite present in said graphite particles;

modifying the percentage of 3R phase graphite in said graphite particles to a desired 3R phase graphite level;

providing a cathode; and interposing a non-aqueous electrolyte containing a solvent and salt between the anode and cathode.

In another aspect, the invention is directed to a method of preparing an electrochemical cell and reducing the first capacity loss of said electrochemical cell, which method comprises the steps of:

providing an anode comprising graphite particles;

increasing the percentage of 3R phase graphite present in said graphite particles;

providing a cathode; and interposing a non-aqueous electrolyte containing a solvent and salt between the anode and cathode.

In yet another aspect, the invention is directed to a method of preparing an intercalation based carbon anode comprising graphite particles capable of producing less than about 10 percent first cycle capacity loss when employed in an electrochemical cell, which method comprises the steps of:

measuring the percentage of 3R phase graphite present in said graphite particles; and increasing the percentage of 3R phase graphite in said graphite particles to at least about 30 percent.

A preferred method of increasing the percentage of 3R phase comprises grinding said graphite particles so as to convert graphite in the 2H phase to the 3R phase wherein said graphite particles have an average diameter in the range of about 5 to about 15 µm.

Among the important features of the invention are that: (1) the anode has a specific electrode capacity of greater than 350 mAh/g, (2) the electrochemical cell has a cycle life of greater than 1000 cycles, and (3) the electrochemical cell has a first cycle capacity loss of only about 5–15 %, where the first cycle capacity loss (%) =

$$\frac{(\text{first cycle dishcarge capacity} - \text{first cycle charge capacity}) \times 100\%}{\text{first cycle discharge capacity}}$$

DETAILED DESCRIPTION OF THE PREFERRED EMBODIMENTS OF THE INVENTION

The invention is directed to employing anodes comprising graphite having a high 3R phase (rhombohedral) content relative to the 2H phase (hexagonal) content. It has been demonstrated that electrochemical cells employing said anodes have a lower first capacity loss. The invention is also directed to methods of increasing the 3R phase content in graphite.

Anodes of the present invention can be employed in rechargeable electrochemical devices, particularly solid electrochemical cells and batteries, that include: a cathode, an intercalation based carbon anode comprising the graphite modified by the inventive method, with each electrode capable of reversibly incorporating (e.g., intercalating) an alkali metal ion, and a polymeric matrix containing an organic solvent and a salt of the alkali metal. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 25 μm to about 75 μm in thickness, preferably about 35 μm to about 65 μm, and more preferably about 45 μm to about 55 μm.

Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm. Current collectors for the anode and cathode can comprise, for example, a screen, grid, expanded metal, woven or non-woven or knitted wire fabric formed from an electron conductive material such as metals or alloys. Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. No. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and a polymeric electrolyte interposed therebetween. The polymeric matrix can function as a separator.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a nonpolymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the-like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., *Proc. Int. Power Sources Symp.*, 34th, pp. 81–83 (1990) and by Abraham et al., *J. Electrochemical Society*, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include, by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidene difluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, NaSCN, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1-1,3-dioxan-2-one; 5-methyl-1,3-dioxan-2-one; 4-methyl-1,3-dioxan-2-one; 5,5-diethyl-1,3 -dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

Graphite is made of planar hexagonal networks of carbon atoms (honeycomb) with two different crystalline forms (or phases): hexagonal (2H) and rhombohedral (3R). These two crystalline forms are also referred to as α-and β-graphite, respectively. (See Greenwood and Earnshow, *Chemistry of the Elements*, Pergamon Press pp 303–304 (1984)). The two phases are interchangeable by grinding whereby 2H converts to 3R or heating to high temperature whereby 3R converts to 2H. This conversion introduces more turbostratic disorder, in which the stacking sequence of the parallel layers is completely randomized, into the graphite structure. There is no known method of separating the two different phases within a mixture. The phases can be detected by x-ray diffraction, as further described herein.

The compatible anodic materials of the present invention comprise graphite (natural, synthetic, or a mixture of both) which has a 3R phase content preferably is at least 10%(wt), more preferably in the range from about 20% to about 40%(wt). Total graphite preferably comprises from about 50% to about 90%(wt), more preferably from about 70% to about 90% (wt) of the anodic material. Preferred synthetic graphites are commercially available under the designation SFG-6™ and SFG-15™, from Lonza G&T Ltd., Sins, Switzerland.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., LiCoO$_2$ and LiCoVO$_4$, lithiated manganese oxides, e.g., LiMn$_2$O$_4$, lithiated nickel oxides, e.g., LiNiO$_2$ and LiNiVO$_4$, and mixtures thereof. Cathode-active material blends of Li$_x$Mn$_2$O$_4$ (spinel) is described in U.S. Pat. No. 5,429,890 which is incorporated herein. The blends can include Li$_x$Mn$_2$O$_4$ (spinel) and at least one lithiated metal oxide selected from Li$_x$NiO$_2$ and Li$_x$CoO$_2$ wherein 0<x<2. Blends can also include Li$_y$-α-MnO$_2$ (0≦y<1) which is Li$_y$NH$_4$Mn$_8$O$_{16}$ (0≦y<1) which has a hollandite-type structure. Li$_y$-α-MnO$_2$ where 0≦y<0.5 is preferred. αMnO$_2$ can be synthesized by precipitation from a reaction between a MnSO$_4$ solution and (NH$_4$)$_2$S$_2$O$_8$ as an oxidizing agent.

Lithiation (also referred to as "prelithiation") of αMnO$_2$ can be accomplished via a solid state reaction:

NH$_4$Mn$_8$O$_{16}$+LiOH→LiMnO$_2$ (400° C.).

Li-α-MnO$_2$ retains the same structure as Hollandite. See, Botkovitz et. al., *J. of Power Sources*, 43–44 (1993) 657–665, which is incorporated herein, for a discussion of the structure and electrochemical characteristics of Li-α-MnO$_2$. Li$_y$-α-MnO$_2$ 0≦y<0.5 is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000. Also included is an ion conducting amount of an inorganic ion salt. Generally, the amount of the salt is from about 1 to about 25 weight percent. (All weight percents are based on the total weight of the cathode.) The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100, 000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be employed to form anode structures for prior art electrochemical cells. The following illustrates a method of how an electrolytic cell could be fabricated. Example 1 describes x-ray techniques for determining the phase content for 2-phase graphites; and Example 2 describes a method of modifying (i.e., increasing) the 3R phase content in graphite. Examples 3 and 4 describe the process of preparing the anode and cathode, respectively. Example 5 describes the procedures for fabricating a solid electrolytic cell. Example 6 demonstrates the correlation between first capacity loss and 3R phase content.

The invention will be described using the anode and cathode structures wherein electrode materials (or films) are laminated onto both sides of the current collectors, however, it is understood that the invention is applicable to other configurations, for example, where one side of the anode and/or cathode current collector is laminated. Furthermore, in the following examples, graphites listed in Table 1 were tested.

TABLE 1

| Graphite Designation | Manufacturer's Designation | Surface Area (BET) m²/g | Particle Size (μm) | 3R % |
|---|---|---|---|---|
| A-1 | SFG-6 | 24.9 | 6 | 32 |
| A-2 | SFG-15 | 10.0 | 15 | 30 |
| A-3 | SFG-44 | 4.8 | 44 | 22 |
| A-4 | SFG-75 | 4.0 | 75 | 14 |
| B-1 | KS-6 | 24.9 | 6 | 19 |
| B-2 | KS-15 | 18.2 | 15 | 7 |
| B-3 | KS-25 | 14.5 | 25 | 8 |
| B-4 | KS-44 | 12.7 | 44 | 5 |
| B-5 | KS-75 | 10.5 | 75 | 5 |
| C-1 | MCMB-2528 | 2.1 | 25 | 0 |
| C-2 | MCMB-628S | 2.7 | 6 | 0 |
| D-1 | CN-35 | 9.8 | 35 | 19 |
| D-2 | CN-35A | 10 | 35 | 20 |
| E-1 | #5535 | 10.0 | 35 | 5 |
| E-2 | BG-39 | 15.1 | 39 | 5 |
| F-1 | F399 | 25.0 | 10 | 26 |

The "A" and "B" series of graphite are available from Lonza G & T, Ltd. (Switzerland), the "C" series are available from Osaka Gas Co., (Japan), and "D" and "E" are available from Superior Graphite Co. (Chicago, Ill.). F-1 is available from Alumina Trading Co. (New York, N.Y.). A, B and C are synthetic graphite and D, E and F are natural graphite. Within, each series, the graphites are from the same raw precursor and processed the same way.

EXAMPLE 1

Graphite Structure Models

In order to calculate the 3R phase content for a given graphite from its XRD pattern, a structural model is needed. In Shi et al., *J. Appl. Crystallography* 26, 1179 (1993), which is incorporated herein, a two layer graphite structural model was proposed for the XRD pattern simulation. This two layer model will also be used here for the XRD pattern calculation in the 2H graphite structure. In addition, a three layer structural model is developed and used for the XRD pattern calculation of the 3R phase in graphite.

Figure 2:
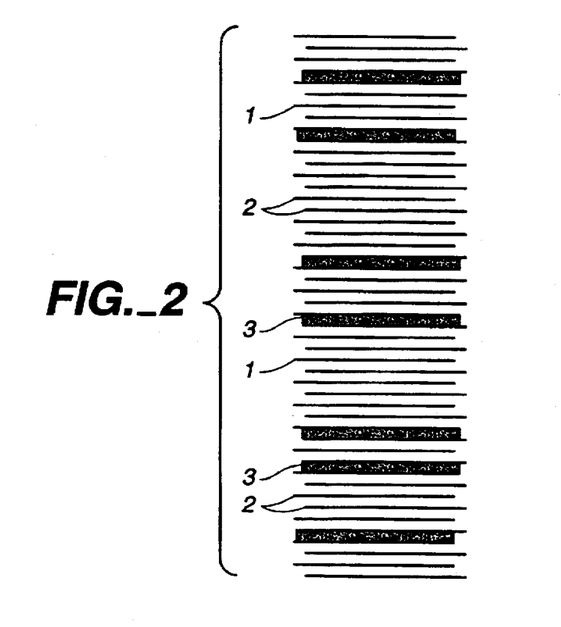
FIG. 2 is an illustration of the 2H graphite structure.

Since the carbon layers in the 2H graphite are stacked in the ... ABAB ... sequence, it is only natural to consider the two AB layer package as a structural building block. Furthermore, turbostratic disorder can be introduced into the model by possible random stacking between two adjacent building blocks. This structural model is the so-called the "two layer model" described in Shi et al. Therefore, in terms of the XRD pattern calculation, the 2H structure is reduced to a one dimensional random stacking structure, i.e. . . . □□⊥□□□™□□™□. . . where □ stands for the AB package and ™ indicates where a random stacking occurs. The building block AB will then act as a giant x-ray scattering unit, which considerably simplifies the calculation. FIG. 2 shows a schematical view of this two layer model. Each graphite layer is indicated by the reference number 1. If one calls the AB package, which does not contain random disorder stacking, the "good package" (reference number 2) and the two adjacent layers with random stacking in between as the "bad package" (the shadow areas 3 in FIG. 2), then one can introduce an important parameter, $P_{2H}$. This parameter may be defined as follows, $$P_{2H} = \frac{<\text{\# of bad packages}>}{<\text{\# of good packages}> + <\text{\# of bad packages}>} \quad (1)$$

where <> stands for the average over all graphite particles. $P_{2H}$ is a measurement of the turbostratic disorder in the graphite structure. It can also be interpreted as the probability of finding a random stacking between two adjacent good packages. $P_{2H}$ will be included in the x-ray scattering pattern calculation as a refineable parameter.

For the 3R structure, the graphite layers are stacked in the ... ABCABC ... sequence. The basic structural building block, now, is the three layer ABC package. Similarly, turbostratic disorder can also be introduced into the structure as a disordered stacking between two adjacent ABC packages. This 3R structural model is referred as the "three layer model". In this case, the good package is a three layer package and the bad package remains a two layers one. The random stacking probability in a three layer model, $P_{3R}$, can be defined according to equation (1). $P_{3R}$ is a measurement of turbostratic disorder in the 3R graphite structure, which can be obtained by refining the graphite XRD pattern.

XRD Refinement Program for Two-Phase Graphite

The detailed mathematics involved in deriving the intensity of the 2H graphite ($I_{2H}$) based on the two layer model are discussed in Shi et al. The algorithm used in the above calculations can be adapted to calculate the XRD intensity of the 3R graphite ($I_{3R}$). Therefore, the total XRD intensity from a two-phase graphite can be written as:

$$I=(1-x)I_{2H}+xI_{3R} \quad (2)$$

where x is the percentage of the 3R content in a given graphite.

An automated structure refinement program (set forth in the microfiche appendix) was developed which can analyze powder XRD data from mixtures of the 2H and 3R graphite phases. The program allows extraction of structural parameters by a least-squares minimization of the difference between experimentally observed XRD data and the XRD pattern predicted by combining the two and three layer structural models described previously. The observed intensity $I(2\theta)$ can be described by:

$$I(2\theta)=x\,I_{3R}(2\theta)+(1-x)I_{2H}(2\theta)$$

where $I_{3R}(2\theta)$ and $I_{2H}(2\theta)$ are the predicted diffraction profiles of the 3R and 2H phases respectively, and x is the fraction of 3R phase content.

The program is written in Fortran 77 and can run on any computer with a Fortran 77 compliant compiler. The input to the program is a control file describing the initial guesses for the parameters; and a data file containing observed (Cu-Kα) XRD intensities as a function of scattering angle (2θ)—one pair of numbers for each data point. The output are the structural parameters of the two phases, and the fraction of the 3R phase (x).

The structure of the program consists of a Main routine and 10 other source files containing subroutines 1–10. The parameters determined by the programs are listed in the Main routine and includes the fraction of 3R phase content.

Subroutine 1 lists the calculation of the scattering form factor of the carbon atom.

Subroutine 2 lists the calculation of the numerical derivative of the least-squares fitting function.

Subroutine 3 lists the calculation of XRD intensity as a function of scattering vector.

Subroutine 4 lists descriptive status headers which are printed out when the program runs.

Subroutine 5 lists the calculation of the modulation function which takes into account turbostratic disorder and strain along the Z direction.

Subroutine 6 lists the calculation of $x^2$, the goodness of fit parameter.

Subroutine 7 lists the implementation of the Levenberg-Marquardt iterative least-squares minimization algorithm.

Subroutine 8 lists the printing of the parameters output from the program after least-squares fitting.

Subroutine 9 lists the calculation of an angular integral of the scattering from a hkl rod in reciprocal space.

Subroutine 10 lists the calculation of the integral used for the integral of Subroutine 9.

X-Ray Diffraction Analysis of Graphite

Figure 1:
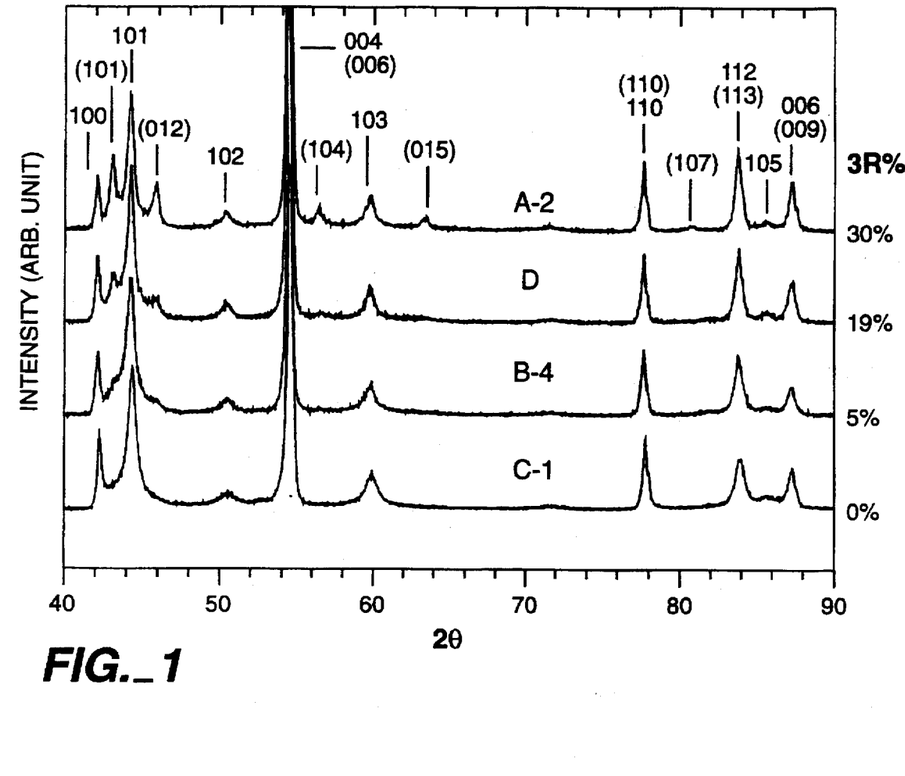
FIG. 1 depicts x-ray diffraction (XRD) patterns for various graphites.

X-ray diffraction (XRD) studies were conducted on a Siemens D5000 diffractometer with fixed diaphragms and equipped with a monochromator. A Cu anode was used for x-ray (Cu Kα) radiation generation. The measuring circle diameter of the goniometer was 401 mm. The divergence and scatter-radiation diaphragm were set to 0.1 mm for all the measurements described here. The maximum resolution was about 0.01°. The weighted average Cu Kα wavelength is λ=1.5418 Å. All data were collected between 10° and 90° (2θ) at 0.05 degree scanning step with a 20 second interval between each step for refinement analysis described herein. A typical data scan runs for more than 12 hours. FIG. 1 shows four XRD patterns for graphite samples A-2, D, B-4 and C-1. The Miller indexes for the 3R phase are indicated in parentheses to distinguish them from those of 2H phase. The difference in these XRD patterns is mainly due to different phase ratio of 2H and 3R in each graphite. The 3R phase content for each graphite is shown on the right hand side of FIG. 1.

Figure 3:
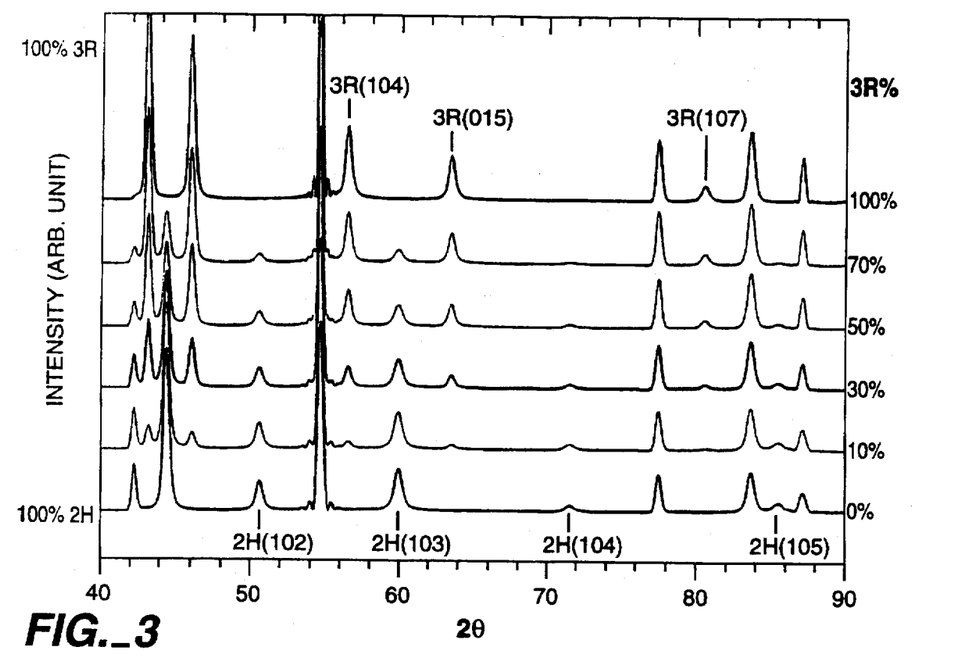
FIG. 3 is a series computer simulated of XRD patterns for graphite having different 3R contents.
Figure 4:
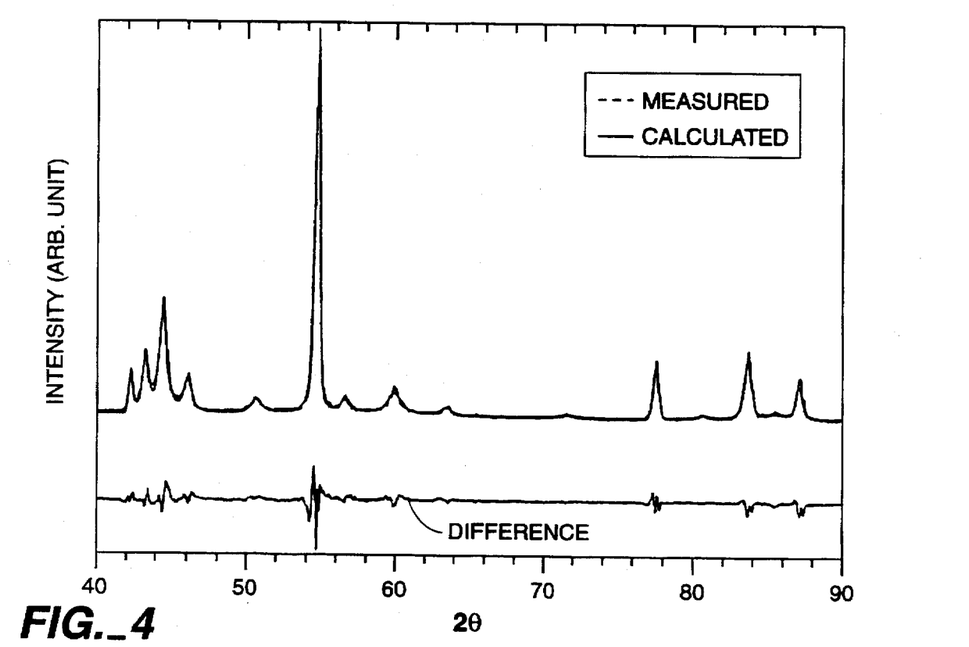
FIGS. 4, 5 and 6 are measured and simulated XRD patterns for various graphites.
Figure 5:
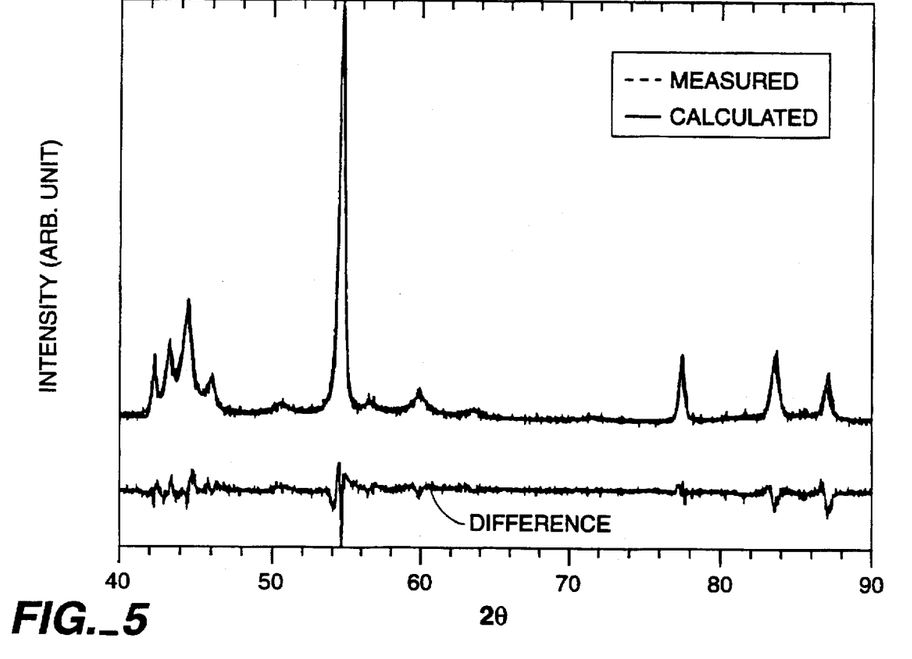
Figure 6:
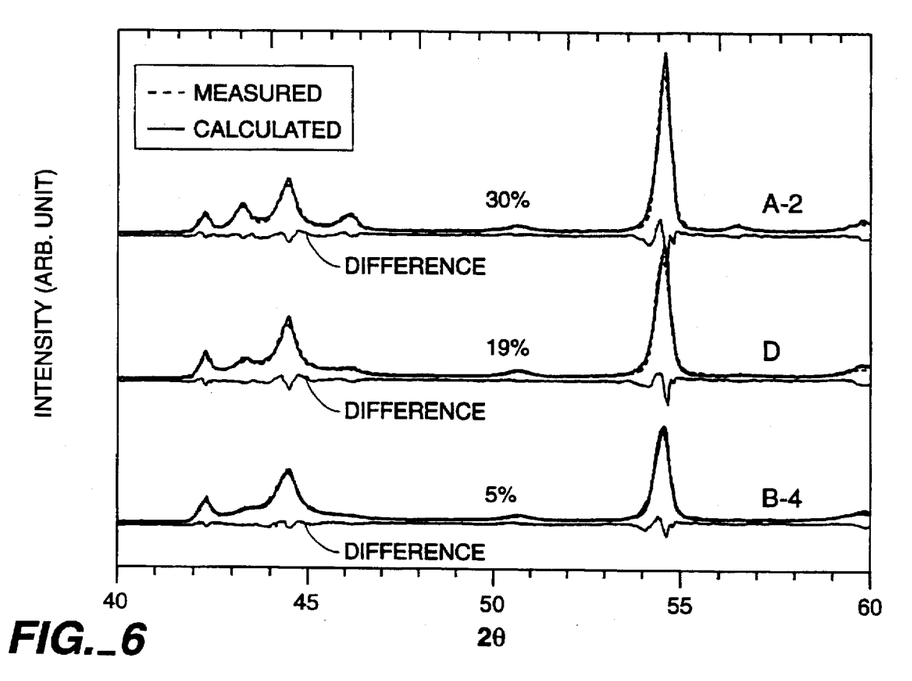

FIG. 3 shows a series of XRD patterns calculated using the two-phase refinement program. From bottom to top, the 3R phase content increases from 0% to 100%. Similarly, the intensity corresponding to the peaks originating from the 2H phase, such as 2H(102), 2H(103), 2H(104), is reduced. At the same time, the peaks corresponding to 3R phase, such as 3R(105), 3R(103), 3R(104) start to appear. Note that the pattern for the 30% 3R phase in FIG. 3 is similar to XRD pattern for A-2 in FIG. 1, which has about 30% of the 3R phase. XRD refinement examples shown in FIGS. 4 and 5 are for 2 two-phase graphites, A-2 and C-2, respectively. The difference between the measured and the calculated intensities are also plotted in the figures. FIG. 6 compares three XRD refinements for graphites A-2, D and B-4 with varying 3R contents. These 3 two-phase graphites contain different levels of 3R phase and can be fitted using above model nicely. Based on these results, it is clear that the refinement computer program works very well for refining XRD patterns for two-phase graphites.

In summary, FIG. 1 shows the XRD patterns from four different graphites. The 3R contents which were calculated using the refinement program described above were approximately 0, 5, 19, 30% respectively from bottom to top. The synthetic graphite C-1 is a pure 2H phase graphite. The 2H(100) and 2H(101) peaks are clearly separated with no additional peaks. The synthetic graphite A-2 has the highest 3R concentration among these four graphites. The 3R(101) and 3R(102) peaks are now very prominent and their relative intensities are comparable with those of the 2H(100) and 2H(101) peaks. When the 3R content exceeds approximately 10%, almost all of the 3R phase peaks will have considerable intensities and may be identified in the XRD diagrams. However, for a graphite with less than 10% 3R phase content, the x value derived from the XRD refinement will include some error due to the weak 3R peaks in the pattern.

EXAMPLE 2

Figure 7:
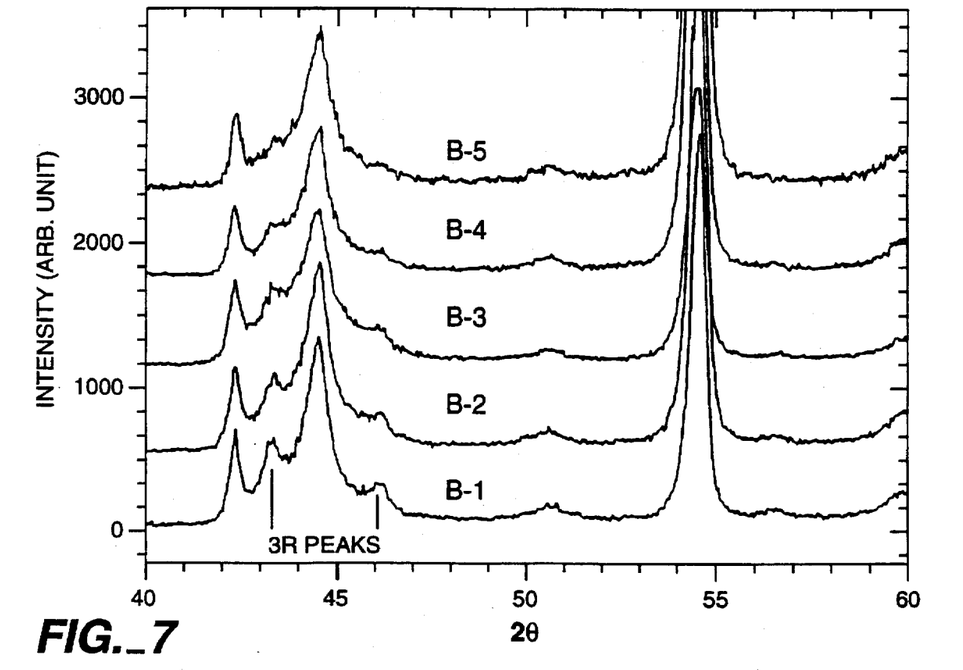
FIGS. 7 and 8 are XRD patterns which show the correlation between particle size and 3R content in graphite.
Figure 8:
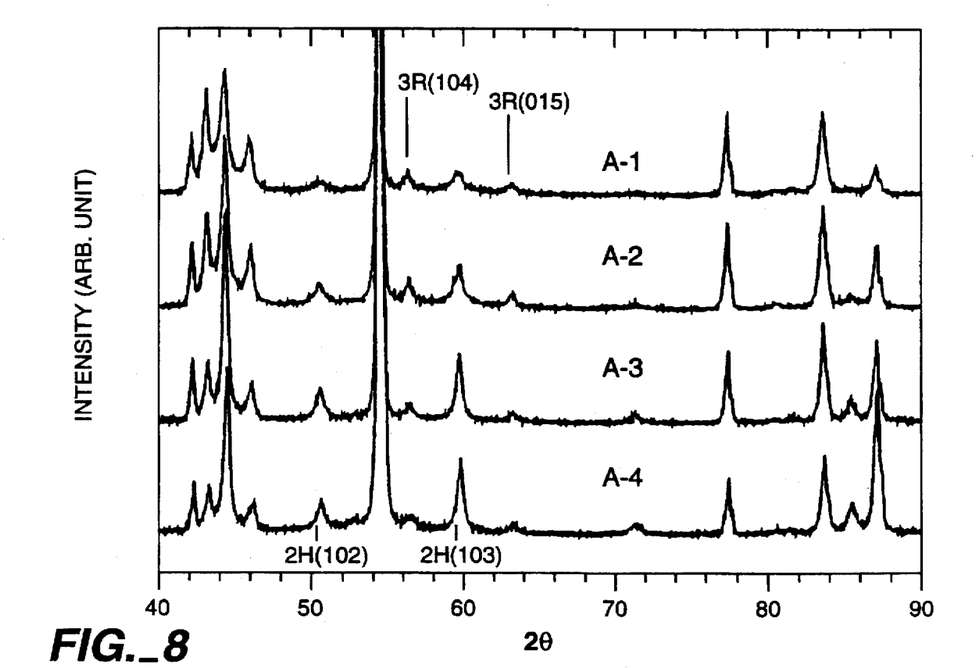
Figure 9:
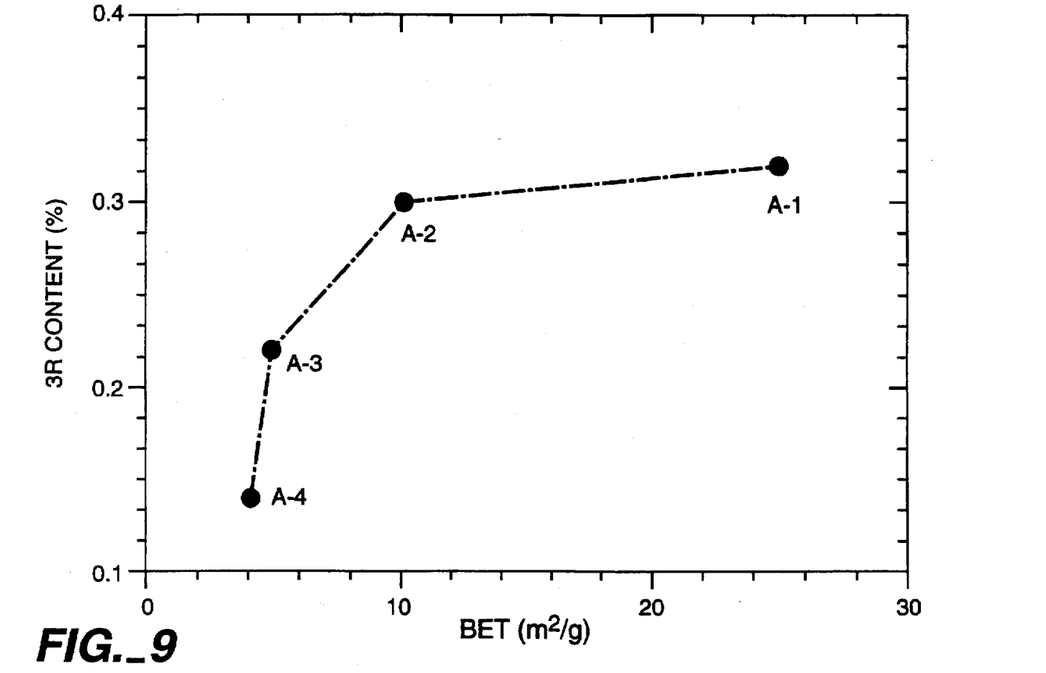
FIG. 9 is a graph of 3R phase content versus BET surface area for graphite.

The 3R phase content of graphite can be increased as the graphite particle size is reduced. FIG. 7 shows the effect of reducing the graphite particle size upon the 3R concentration. The starting graphite was B-5, with a particle size of approximately 75 μm. From top to bottom, the average graphite particle size is reduced by a factor of about 10. As is evident, as the graphite particle size is reduced, the corresponding intensities of the 3R peaks are increased. FIG. 8 shows the XRD patterns of synthetic graphites A-1, A-2, A-3 and A-4 with four different particle sizes. From graphite A-4 (about 75 μm) to A-1 (about 6 μm), the particle size is reduced by about one order of magnitude. Similarly, the peak intensities from the 3R phase are significantly increased compared to that from the 2H phase. The 3R contents of the four different particle size graphites were plotted against the BET surface area. This is shown in FIG. 9. As expected, as the particle size is reduced, the BET surface is increased and so does the 3R contents in each graphite.

It should be noted that graphite compositions from different sources do not necessarily have the same 3R content even if their particle sizes are the same. For example, graphites A-4 and B-5 (each having particles size of about 75 μm), the content of the 3R phase in these two graphite is significantly different, 5% for B-5 and 15% for A-4. This also can be seen from the nonlinear relation between the 3R content and the BET surface area in FIG. 9. Therefore, one can conclude that the 3R content in a graphite does not have a linear relationship with the graphite particle size. Rather, it is dependent on many factors, including for example, graphite particle size, raw precursor, and synthetic processing. Nevertheless, a preferred method of increasing the percentage of the 3R phase in graphite comprises grinding graphite particles so as to convert graphite from the 2H phase to the 3R phase, preferably wherein the graphite particles have an average diameter in the range of about 5 μm to 15 μm. It is expected that with the present invention, graphite having up to about 35% or higher of 3R can be prepared by a process comprising, for example, (1) careful selection of graphite precursors capable of producing graphite with high 3R content and (2) grinding graphite particles.

FIG. 7 are XRD patterns for 5 graphite samples each with different particle sizes. The XRD patterns show the effect of reducing the graphite particle size on the 3R concentration. B-1 and B-5 graphite have particle sizes of about 6 μm and 75 μm, respectively. As is evident, as the graphite particle size decrease, the corresponding intensities of the 3R peaks increases.

EXAMPLE 3

The anode current collector employed was a sheet of expanded copper metal that is about 50 μm thick. It is available under the designation 2Cu5-125 (flatten) from Delker Corp., Branford, Conn.

The anode slurry was prepared as follows:

A polymer mixture comprising a copolymer of vinylidene difluoride (VDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, and 10.5 grams dibutyl phthalate. A preferred graphite comprises a synthetic graphite available under the designation SFG-15™ from Lonza G & T, Ltd. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes. In this Example, SFG-15 which has a 3R content of about 30% was employed. Alternatively, a different graphite sample could have been employed. The 3R content of the sample can be increased by grinding to the desired 3R level which can be confirmed by the XRD technique described above. (Optionally, a surfactant can be added to the graphite mixture to facilitate dispersion to the graphite. Preferred surfactants include Pluronic FC68™ from BASF, Mt. Olive, N.J. and Flurad 430™ from 3M Co. St. Paul, Minn.)

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 4

The cathode current collector employed was a sheet of expanded aluminum that is about 50 μm thick. The aluminum grid is available under the designation 2AL5-077 from Delker Corp. The cathode slurry was prepared as follows:

A polymer mixture comprising a copolymer of vinylidene difluoride (VDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material comprising $Li_xMn_2O_4$ (spinel) ($0 \leq x < 2$) and 2.4 grams of carbon black (Super P™) into a solution containing 60 grams acetone and 8.7 grams dibutyl phthalate. The mixture was then vigorously mixed in a high shear mixer until a substantially homogeneous blend was formed.

The cathode slurry was prepared by mixing the polymer mixture and the cathode mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 5

A solid electrochemical cell is prepared by first positioning a polymeric matrix between the anode and cathode and thereafter fusing the structures under moderate pressure and temperature (e.g., 130° C.) to form an electrochemical cell precursor. The pressure and temperature employed will depend on the polymer(s) forming the polymer matrix. The polymeric matrix is formed by casting a polymeric slurry comprising acetone, dibutyl phthalate, silanized fumed $SiO_2$, and the VDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} \approx 1.0.$$

Next the dibutyl phthalate plasticizer is extracted from the precursor. Extraction can be accomplished using conventional organic liquid solvents such as diethyl ether or by a supercritical fluid which, for instance, refers to a gas compressed and heated to either supercritical or subcritical conditions to achieve liquid-like densities. Supercritical fluids are known in the art. See, for example, U.S. Pat. Nos. 5,013,366, 5,267,455, 4,219,333, 4,012,194, and 3,969,196, which are incorporated herein. A preferred supercritical fluid is carbon dioxide. The precursor is then pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

EXAMPLE 6

Performance of Electrochemical Cells

Electrochemical cells containing anode compositions comprising different graphite materials (i.e., having different 3R levels) were tested. The graphite electrodes were made by mixing 10 wt. % of polyvinylidine fluoride (PVDF) binder (Polysciences, Inc. MW 120,000) and 90 wt. % graphite powder in a dimethylformaminde (DMF) solution. The mixture was blended by a homogenizer for about 5 to 10 minutes to achieve a uniformly dispersed slurry. The slurry was then casted on a copper foil (25 mm thick) by using a doctor blade type casting tool. The coated film was dried in a vacuum oven at 100° C. for 12 hours. All cells were assembled in an argon glove box. The counter electrodes were lithium metal foil (75 mm) from FMC and the separator was a glass fiber type paper. The electrolyte was 1M LiPF$_6$ in 66:34 w/o EC/DMC. A typical graphite electrode contained about 10 mg/cm$^2$ active material.

Figure 10:
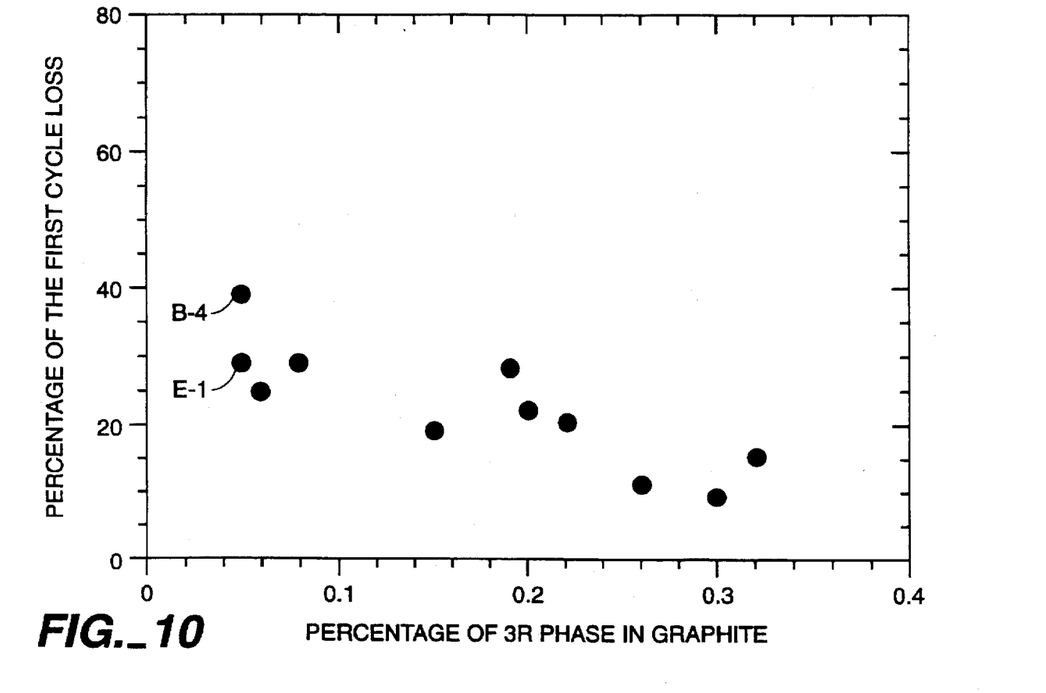
FIG. 10 is a graph of first cycle loss vs. 3R phase content in electrochemical cells.

FIG. 10 is a graph of percent of first cycle capacity loss versus percentage of 3R phase in graphite for electrochemical cells fabricated with 11 different graphite powders. The 11 samples are graphites A(1-4), B(1-4), D-2, E-1, and F-1 listed in Table 1. As is apparent, the percentage of the first cycle loss decreases with increasing 3R phase content.

It is expected that lithium electrochemical cells employing the inventive anode structure will have a first cycle capacity loss of less than about 15%, preferably less than about 12% and more preferably less than about 10%. In addition, the inventive method can have a specific electrode capacity of greater than 300 mAhr/g, and more preferably 350 mAhr/g.

For a perfect stacking of the 2H graphite structure, the maximum theoretical lithium intercalation capacity is 372 mAh/g. However, this value is never attained experimentally. The reason is that almost all of the graphite has more or less some turbostratic stacking in its structure, which will not contribute to the total lithium intercalation capacity. Both the 3R and the 2H phase contribute to the total reversible lithium capacity similarly. Lithium electrochemical cells should have a cycle life at greater than 1000 cycles, and more preferably between about 1500 to about 2000 cycles.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrochemical cell and controlling the first cycle capacity loss of said electrochemical cell, which method comprises the steps of:
   (a) forming an intercalation based anode comprising graphite particles by a process comprising:
   (i) providing an initial graphite composition;
   (ii) measuring the percentage of 3R phase graphite present in said initial graphite composition;
   (iii) increasing the percentage of 3R phase graphite in said initial graphite composition to form a second graphite composition which comprises graphite particles having an average diameter of less than 75 μm;
   (b) providing a cathode; and
   (c) interposing a non-aqueous electrolyte containing a solvent and lithium salt between the anode and cathode.

2. The method of claim 1 wherein the step of increasing the percentage of 3R phase graphite comprises:
   converting graphite in the 2H phase to graphite in the 3R phase.

3. The method of claim 2 wherein the step of converting the graphite forms graphite particles in said second graphite composition wherein the percentage of 3R phase graphite is at least about 30 percent.

4. The method of claim 1 wherein the step of increasing the percentage of 3R phase graphite comprises:
   grinding said initial graphite composition to convert graphite in the 2H phase to the 3R phase.

5. The method of claim 4 wherein grinding said initial graphite composition produces particles having an average diameter in the range of about 5 to about 15 μm.

6. The method of claim 1 wherein the cathode comprises cathode active materials selected from lithiated cobalt oxides, lithiated manganese oxides, lithiated nickel oxides, lithiated vanadium oxides, and mixtures thereof.

7. A method of preparing an electrochemical cell and reducing the first capacity loss of said electrochemical cell, which method comprises the steps of:
   (a) forming an intercalation based anode comprising graphite particles by a process comprising:
   (i) providing an initial graphite composition;
   (ii) increasing the percentage of 3R phase graphite present in said initial graphite composition to form a second graphite composition which comprises graphite wherein at least 20 percent of the graphite is 3R phase graphite;
   (b) providing a cathode; and
   (c) interposing a non-aqueous electrolyte containing a solvent and lithium salt between the anode and cathode and wherein the electrochemical cell has a first cycle loss of less than about 15% and a specific capacity of greater than 300 mAh/g.

8. The method of claim 7 wherein the step of increasing the percentage of 3R phase graphite forms graphite particles wherein the percentage of 3R phase graphite is at least about 30 percent.

9. The method of claim 7 wherein the step of increasing the percentage of 3R phase graphite comprises:
   grinding said initial graphite composition to convert graphite in the 2H phase to the 3R phase.

10. The method of claim 9 wherein grinding said initial graphite composition produces graphite particles having an average diameter in the range of about 5 to about 15 μm.

11. The method of claim 7 wherein the cathode comprises cathode active materials selected from lithiated cobalt oxides, lithiated manganese oxides, lithiated nickel oxides, lithiated vanadium oxides, and mixtures thereof.

12. A method of preparing an intercalation based carbon anode comprising graphite particles and controlling the first cycle capacity loss when employed in an electrochemical cell, which method comprises the steps of:
   providing an initial graphite composition;
   measuring the percentage of 3R phase graphite present in said initial graphite composition; and
   increasing the percentage of 3R phase graphite in said initial graphite composition to form a second graphite composition which comprises graphite particles having an average diameter of less than 75 μm wherein the second graphite composition has a lower first cycle capacity loss than the initial graphite composition when employed in the electrochemical cell.

13. The method of claim 12 wherein the step of increasing the percentage of 3R phase graphite comprises:
   converting graphite in the 2H phase to graphite in the 3R phase.

14. The method of claim 13 wherein the step of converting the graphite forms graphite particles in said second graphite composition wherein the percentage of 3R phase graphite is at least about 30 percent.

15. The method of claim 12 wherein the step of increasing the percentage of 3R phase graphite particles comprises:

grinding said graphite composition to convert graphite in the 2H phase to the 3R phase.

16. The method of claim 15 wherein grinding said initial graphite composition produces graphite particles having an average diameter in the range of about 5 to about 15 µm.

17. A method of preparing an intercalation based carbon anode comprising graphite wherein the anode has less than about 10 percent first cycle capacity loss when employed in an electrochemical cell, which method comprises the steps of:

providing an initial graphite composition; and increasing the percentage of 3R phase graphite in said initial graphite composition to form a second graphite composition which comprises graphite wherein at least about 20 percent of the graphite is 3R phase graphite wherein the second graphite composition has a lower first cycle capacity loss than the initial graphite composition when employed in the electrochemical cell.

18. The method of claim 17 wherein the step of increasing the percentage of 3R phase graphite forms graphite particles wherein the percentage of 3R phase graphite in the graphite particles is at least about 30 percent.

19. The method of claim 17 wherein the step of increasing the percentage of 3R phase graphite comprises:

grinding said initial graphite composition to convert graphite in the 2H phase to the 3R phase.

20. The method of claim 19 wherein grinding said initial graphite composition produces graphite particles having an average diameter in the range of about 5 to about 15 µm.

* * * * *